United States Patent
Ingram

(10) Patent No.: US 9,845,124 B1
(45) Date of Patent: Dec. 19, 2017

(54) SOLAR POWER SYSTEM FOR AUXILIARY-POWERED BRAKES AND POWER SYSTEM FOR A TRACTOR TRAILER

(71) Applicant: Dexter Ingram, Atlanta, GA (US)

(72) Inventor: Dexter Ingram, Atlanta, GA (US)

( * ) Notice: Subject to any disclaimer, the term of this patent is extended or adjusted under 35 U.S.C. 154(b) by 0 days.

(21) Appl. No.: 15/175,224

(22) Filed: Jun. 7, 2016

(51) Int. Cl.
| | |
|---|---|
| *F04D 15/00* | (2006.01) |
| *B62D 63/08* | (2006.01) |
| *H02P 6/14* | (2016.01) |
| *B60L 8/00* | (2006.01) |
| *B60L 7/14* | (2006.01) |

(52) U.S. Cl.
CPC ............... *B62D 63/08* (2013.01); *B60L 7/14* (2013.01); *B60L 8/003* (2013.01); *H02P 6/14* (2013.01)

(58) Field of Classification Search
CPC ... B60K 2001/001; G05B 15/02; Y02E 10/50; H02J 3/383
See application file for complete search history.

(56) References Cited

U.S. PATENT DOCUMENTS

| | | | |
|---|---|---|---|
| 6,380,481 B1 | 4/2002 | Muller | |
| 7,338,335 B1 | 3/2008 | Messano | |
| D627,696 S | 11/2010 | Yang | |
| 9,090,253 B2 | 7/2015 | Flath | |
| 2003/0029651 A1* | 2/2003 | Palmeri | B60G 17/0195 180/65.1 |
| 2010/0263703 A1 | 10/2010 | Reichart | |
| 2013/0061902 A1 | 3/2013 | Quinn | |
| 2013/0107555 A1 | 5/2013 | Quinn | |
| 2014/0116077 A1 | 5/2014 | Pierce | |

FOREIGN PATENT DOCUMENTS

WO 2011046206 A1 4/2011

* cited by examiner

*Primary Examiner* — Karen Masih

(57) ABSTRACT

The solar power system for auxiliary-powered brakes and power system for a tractor-trailer is a supplemental electrical system adapted for use with the trailer of a tractor-trailer. The solar power system for auxiliary-powered brakes and power system for a tractor-trailer is designed to: 1) assist in the acceleration of the trailer; 2) use braking energy to generate and store electricity; 3) supplement the stored energy with a renewable source; and, 4) distribute excess energy to the trailer electrical system. In one potential embodiment of the disclosure, the solar power system for auxiliary-powered brakes and power system for a tractor-trailer provides for tapping into the stored electrical energy for external use. The solar power system for auxiliary-powered brakes and power system for a tractor-trailer comprises a plurality of photovoltaic cells, one or more axle assist devices, an electricity storage device, and a distribution system.

8 Claims, 7 Drawing Sheets

SOLAR POWER SYSTEM FOR AUXILIARY-POWERED BRAKES AND POWER SYSTEM FOR A TRACTOR TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and vehicle fittings, more specifically, an electric circuit adapted for use with a vehicle.

SUMMARY OF INVENTION

The solar power system for auxiliary-powered brakes and power system for a tractor-trailer is a renewable energy based electrical system that is adapted for use with the trailer of a tractor-trailer. The solar power system for auxiliary-powered brakes and power system for a tractor-trailer comprises a plurality of photovoltaic cells, one or more axle assist devices, an electricity storage device, and a distribution system. The electricity storage system is a device that is designed to store electricity. Each of the one or more axle assist devices is an electric motor and axle system that is attached to a trailer. When the trailer is accelerating each of the one or more axle assist devices draws energy from the energy storage device and, acting as an electric motor, provides rotational energy to an axle to assist in the acceleration of the trailer. When the trailer is decelerating during braking, the one or more axle assist devices draws energy from the axle and, acting as an electric generator, assists in the deceleration of the trailer by diverting some of the deceleration energy to generate electricity that can be stored in the electricity storage device. The electricity stored in the electricity storage device is further supplemented with a plurality of photoelectric cells. The solar power system for auxiliary-powered brakes and power system for a tractor-trailer is further able to power the auxiliary electrical functions of the trailer. In a potential embodiment of the disclosure, the solar power system for auxiliary-powered brakes and power system for a tractor-trailer further comprises a distribution port that allows power to be tapped from the electricity storage devices for uses external to the trailer.

These together with additional objects, features and advantages of the solar power system for auxiliary-powered brakes and power system for a tractor-trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar power system for auxiliary-powered brakes and power system for a tractor-trailer in detail, it is to be understood that the solar power system for auxiliary-powered brakes and power system for a tractor-trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar power system for auxiliary-powered brakes and power system for a tractor-trailer.

It is therefore important that the claims be regarded as including such equivalent construction insofar as they do not depart from the spirit and scope of the solar power system for auxiliary-powered brakes and power system for a tractor-trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
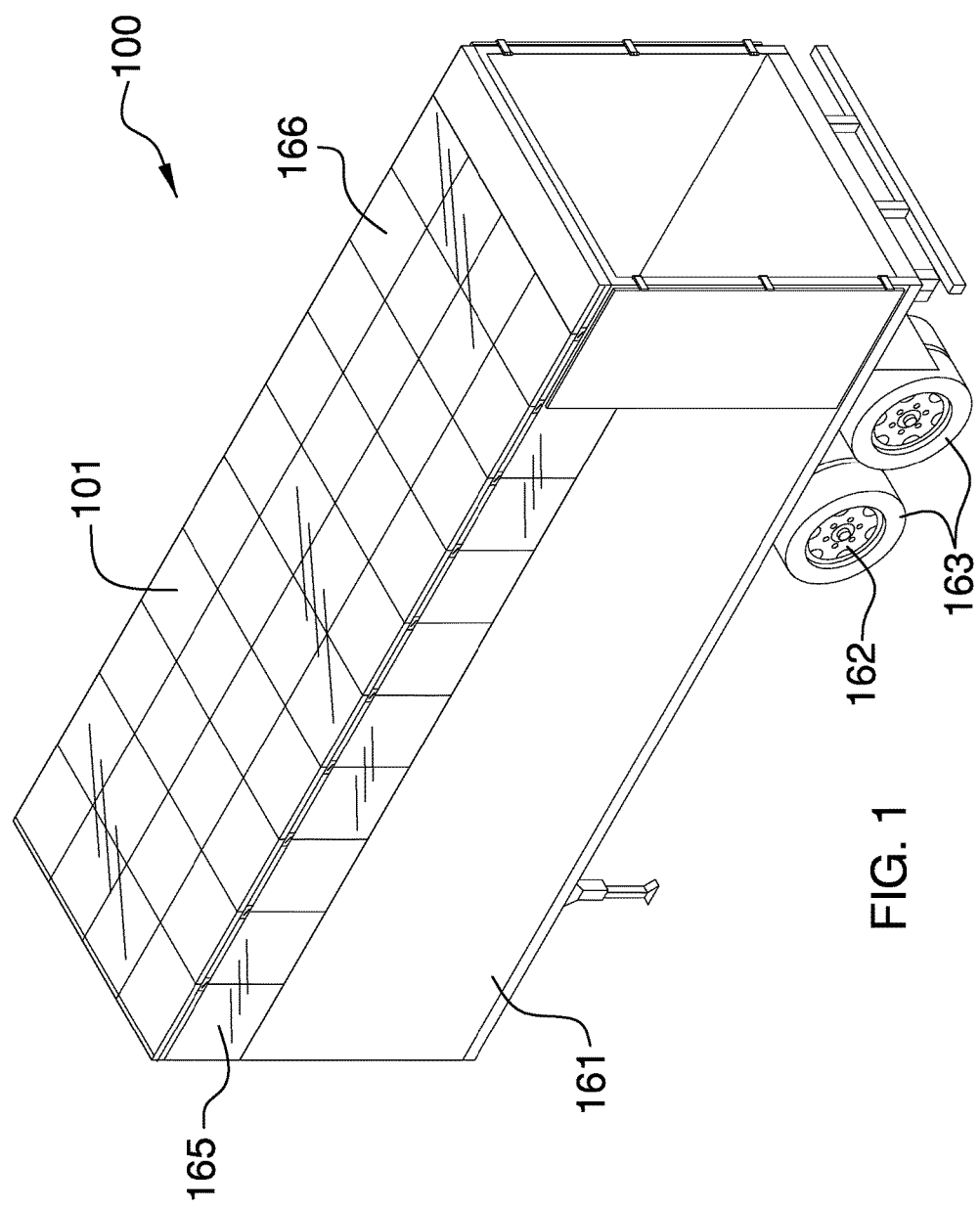
FIG. 1 is a perspective view of an embodiment of the disclosure.
Figure 2:
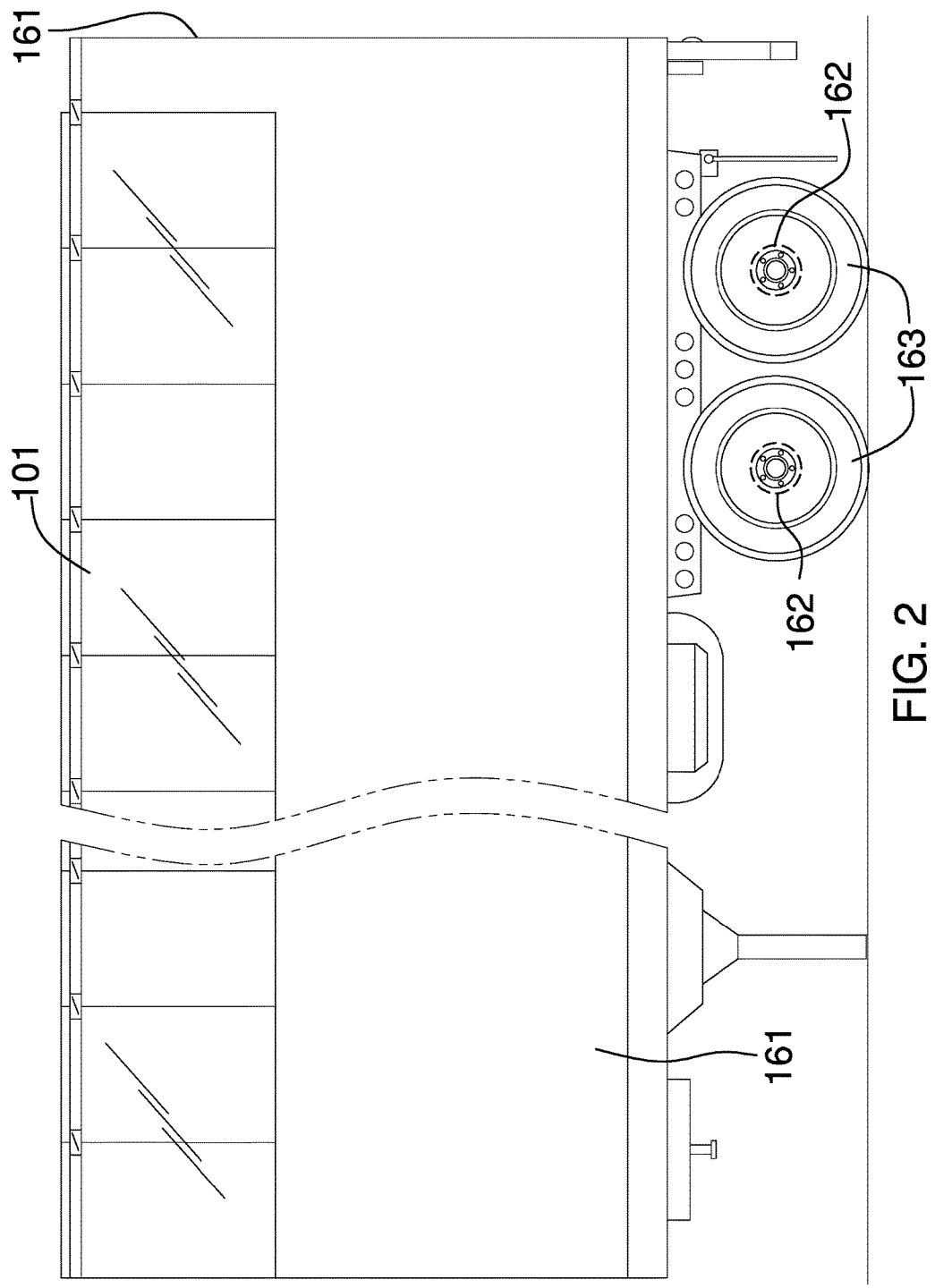
FIG. 2 is a side view of an embodiment of the disclosure across 2-2 as shown in FIG. 1.
Figure 3:
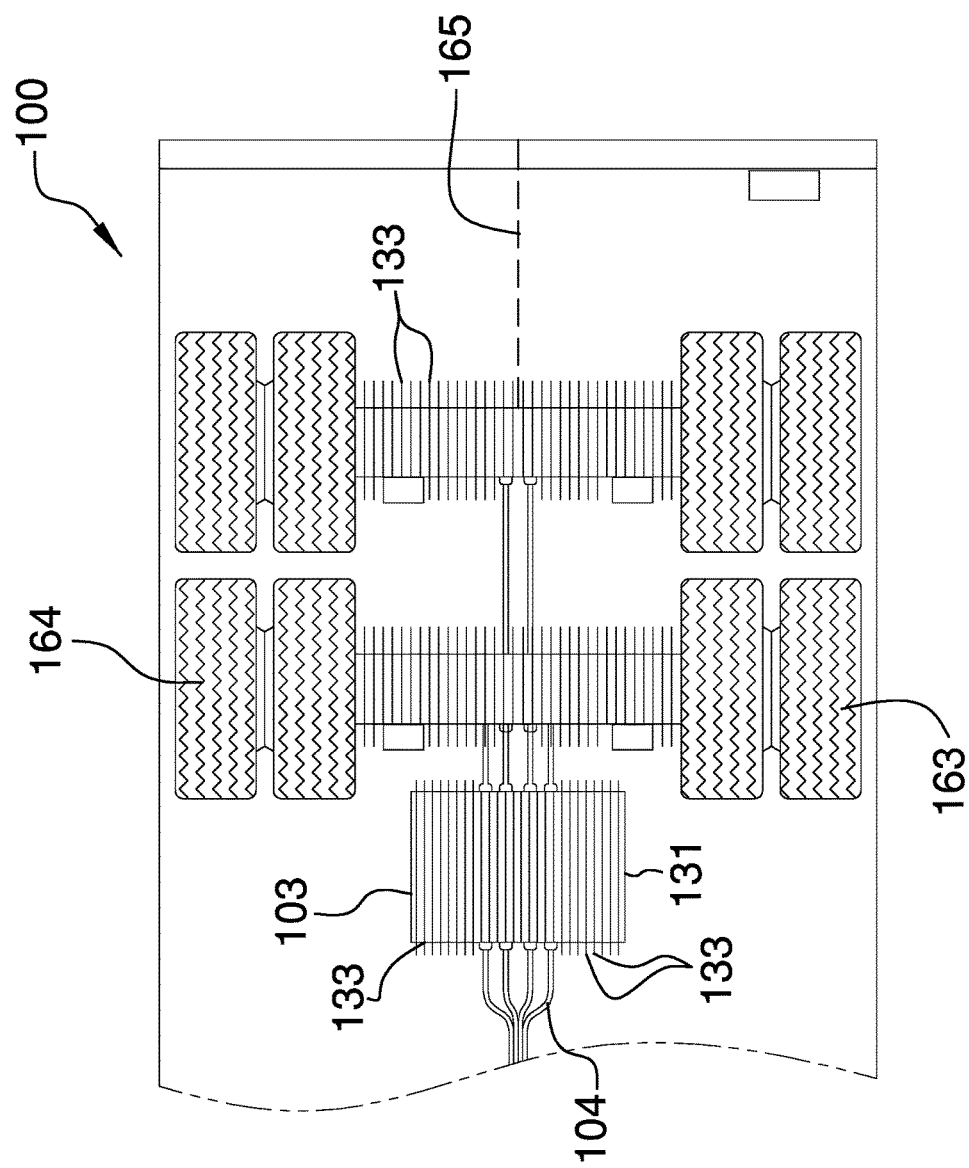
FIG. 3 is a bottom view of an embodiment of the disclosure.
Figure 4:
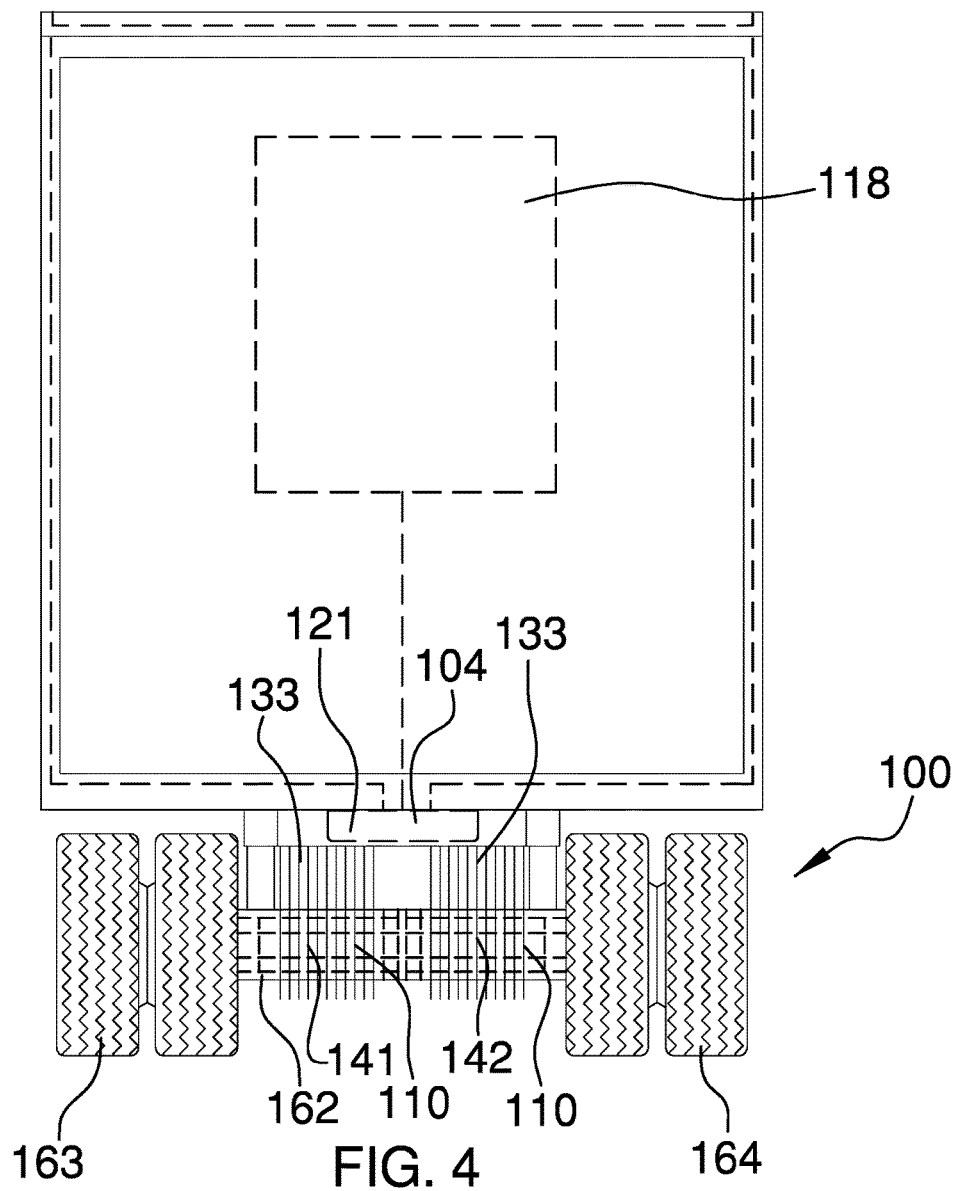
FIG. 4 is a rear view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7.

The solar power system for auxiliary-powered brakes and power system for a tractor-trailer 161 100 (hereinafter invention) comprises a plurality of photovoltaic cells 101, one or more axle assist devices 102, an electricity storage device 103, and a distribution system 104. The invention 100 is a renewable energy based electrical system that is adapted for use with the trailer 161 of a tractor-trailer 161. Each trailer 161 further comprises at least one left tire group 163 and at least one right tire group 164 that are used to suport the trailer 161. The electricity storage device 103 is a device that is designed to store electricity. Each of the one or more axle assist devices 102 is an electric motor and axle 162 system that attaches to the trailer 161. When the trailer 161 is accelerating each of the one or more axle assist devices 102 draws energy from the electricity storage device 103 and, acting as an electric motor, provides rotational energy to an axle 162 to assist in the acceleration of the trailer 161. When the trailer 161 is decelerating during braking, the one or more axle assist devices 102 draws energy from the axle 162 and, acting as an electric generator, assists in the deceleration of the trailer 161 by diverting some of the deceleration energy to generate electricity that can be stored in the electricity storage device 103. The electricity stored in the electricity storage device 103 is further supplemented with a plurality of photoelectric cells. The invention 100 is further able to power the auxiliary electrical functions of the trailer 161. In a potential embodiment of the disclosure, the invention 100 further comprises a distribution port 122 that allows power to be tapped from the electricity storage devices 103 for uses external to the trailer 161.

Each of the one or more axle assist devices 102 is an individual electric motor 110. Each individual electric motor 110 is further defined with a rotor 143 and a stator 144. Each individual electric motor 110 is an electromagnetic device that can: 1) in a "motor" mode convert electric energy into rotational energy that is accessible through the rotation of the rotor 143; or, 2) in a "generator" mode convert rotational energy applied to the rotor 143 into electrical energy that will be stored by the electricity storage device 103. Specifically, the stator 144 comprises a first set of one or more electrical conductors, referred to as stator windings 146. Similarly, the rotor 143 is formed with an item selected from the group consisting of a permanent magnet or a second set of one or more electrical conductors referred to as rotor windings 145.

Figure 5:
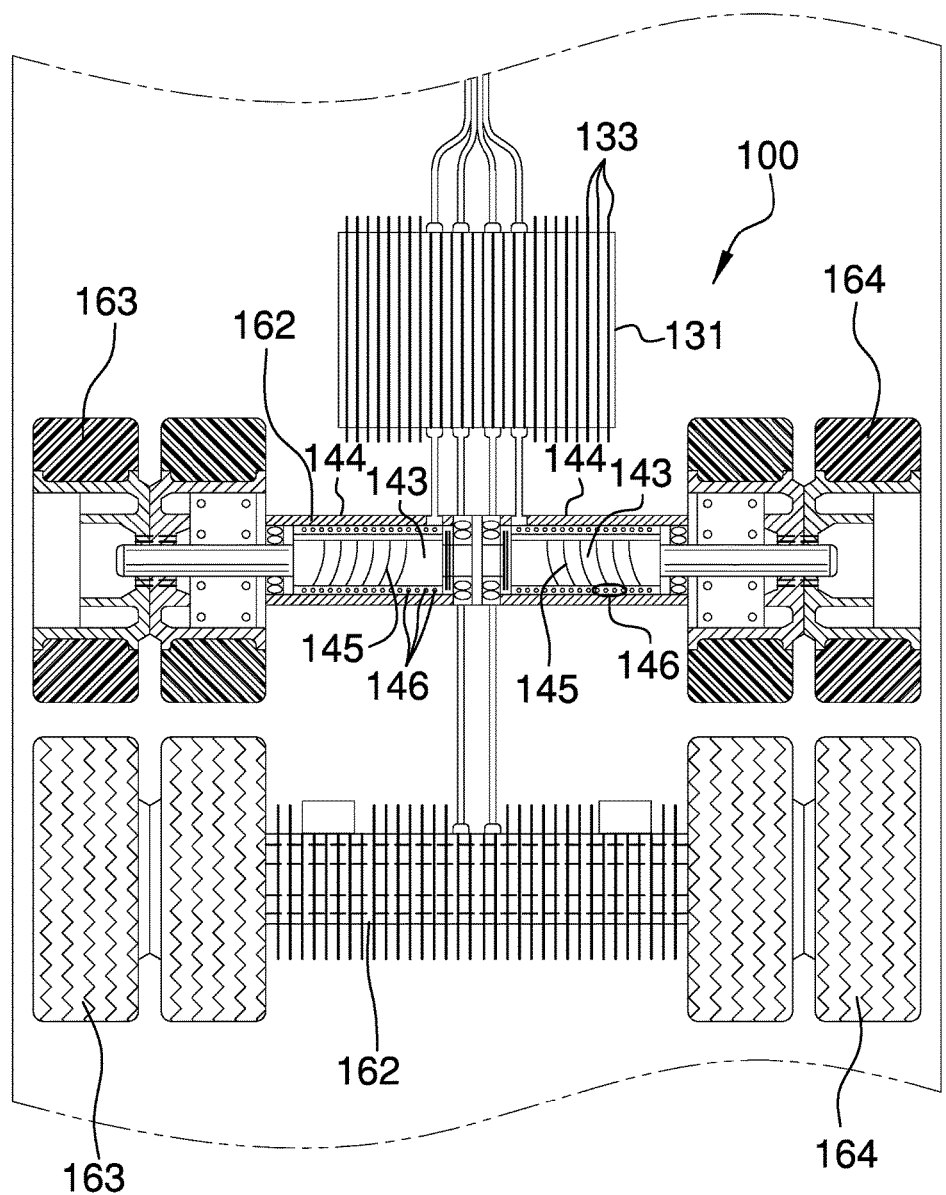
FIG. 5 is a detail view of an embodiment of the disclosure.
Figure 6:
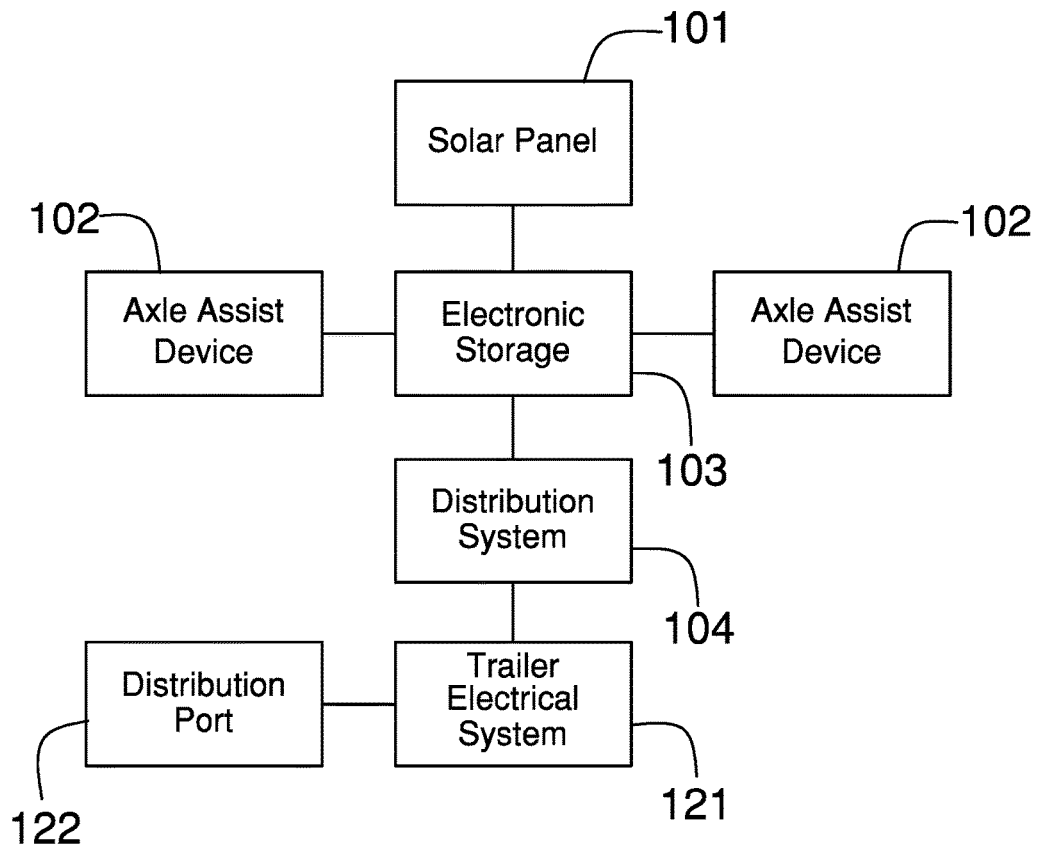
FIG. 6 is a block diagram of an embodiment of the disclosure.
Figure 7:
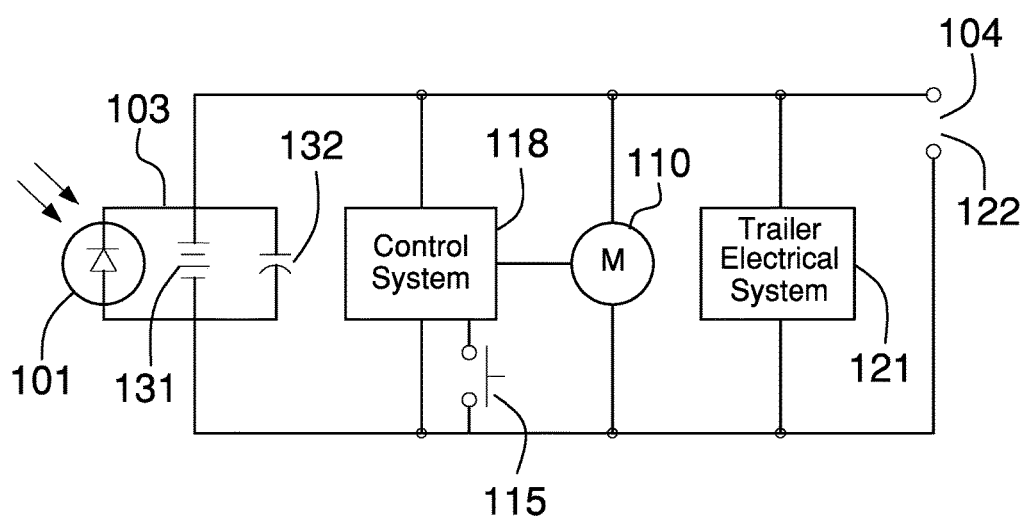
FIG. 7 is a schematic of an embodiment of the disclosure.

As shown in most clearly in FIG. 5, the stator 144 of the individual electric motor 110 is mounted to the chassis of the trailer 161. The rotor 143 of the individual electric motor 110 is mounted individually on an axle 162 that is attached a tire group selected from the left tire group 163 or the right tire group 164. After the axle 162 is modified with the rotor 143 the axle 162 is mounted in the trailer such that the axle 162 and the rotor 143 is inserted into the stator 144 such that individual electric motor 110 is assembled. In this configuration, as the axle 162 of the trailer 161 rotates, the rotor 143 of each individual electric motor 110 will rotate within the stator 144 structure such that electricity is generated for storage in the electricity storage device 130 or energy is withdrawn from the electricity storage device 103 to rotate the rotors 143 and axle 162.

In the first potential embodiment of the disclosure, as shown in FIG. 5, the one or more axle assist devices 102 comprises a first individual electric motor 141 and a second individual electric motor 142. The first individual electric motor 141 is installed by the left tire group 163 of a selected axle 162 and the second individual electric motor 142 is installed by the right tire group 164. The purpose of attaching an axle assist device selected from the one or more axle assist devices 102 to both a left tire group 163 and a right tire group 164 is discussed elsewhere in this disclosure.

The control system 118 is an electrical device that is used to set a target rotational speed for the individual electric motor 110. When the rotation of the axle 162 generates a lower rotational speed of the individual electric motor 110 than the target rotational speed, the individual electric motor 110 draws energy from the electricity storage device 103 such that this energy is transferred to the axle 162 to accelerate the trailer 161. When the rotation of the axle 162 generates a higher rotational speed of the individual electric motor 110 than the target rotational speed, the individual electric motor 110 becomes a generator that converts the rotational energy of the axle 162 into electricity, which is stored by the electricity storage device 103 for future use. This energy transfer has a braking effect on the trailer 161. By controlling the target rotational speed, the individual electric motor 110 can be used to control the energy transfer between the axle 162 and the electricity storage device 103.

The override 115 is an electric circuit that is intended for use when a trailer 161 is not attached to a tractor. The purpose of the override 115 is to allow the individual electric motor 110 to draw power from the electricity storage device 103 such that a person can manually move the trailer 161 a short distance when a tractor is not available. This is the primary reason why it is preferred that axle assist devices selected from the one or more axle assist devices 102 be installed in pairs. By having an individual electric motor 110 associated with both the left tire group 163 and the right tire group 164 as described above it is possible to turn the trailer 161 without the use of a tractor.

The purpose of the electricity storage device 103 is to accumulate excess electrical energy and to store this excess electrical energy for future use. The electricity storage device 103 further comprises a battery 131 and a capacitor 132. The electricity storage device 103 is a combination of a battery 131 and a capacitor 132 that is connected in parallel. In this arrangement, the battery 131 is designed for the efficient conversion of electrical energy of into chemical potential energy and for the efficient conversion of the chemical potential energy back into electrical energy. The sole use of chemical electrical conversions is insufficient in this disclosure because the response time of the conversion back and forth between electrical energy and chemical potential energy is slower than the time that expected voltage variations within the electric circuits described in this disclosure will occur in. To compensate for this, a capacitor 132 is placed in parallel to the battery 131. The capacitor 132 stores electrical charge directly and is able to adjust to the expected voltage variations. In order to supplement the supply of electricity, the electricity storage device 103 is connected to a plurality of photovoltaic cells 101 which provide a consistent source of electricity to the electricity storage device 103 in daylight hours. The plurality of photovoltaic cells 101 are connected in parallel to the battery 131.

As shown most clearly in FIG. 1, the plurality of photovoltaic cells 101 are mounted on the sides 165 and roof 166 of the trailer 161. In the first potential embodiment, the photovoltaic cells 101 cover the entire roof 166 and between one quarter and one third of each side 165 of trailer 161. The results in coverage of up to between 530 and 584 square feet of the exterior of the trailer in photovoltaic cells. In the first potential embodiment of the disclosure, the electricity storage device 103 further comprises a one or more heat sinks 133 that is designed to keep the components of the electricity storage device 103 cool in the event that a sudden deceleration of the trailer 161 generates an overcurrent situation within the electricity storage device 103. The one or more heat sinks 133 are attached to the battery 131 and the capacitor 132. The use of heat sinks are well known and documented in the electrical and mechanical arts.

The electricity stored by the electricity storage device 103 is suitable for use in meeting other electrical demands. The purpose of the distribution system 104 is to transfer electricity from the electricity storage device 103 for use by other electrical devices for other purposes. The distribution system 104 further comprises a trailer electric system connection 121 and a distribution port 122. The trailer electric system connection 121 is an electrical interconnection that allows the electricity storage device 103 to directly power the electrical devices associated with the trailer 161. The distribution port 122 is a connection that allows a user to connect electrical devices that are external to the trailer 161 to the electricity storage device 103 such that the external electrical devices can draw power from the electricity storage device 103.

It is preferred that the individual electric motor 110 be a brushless DC electric motor with a variable speed control. Methods to connect electric motors to electricity storage devices 103 are well known and documented in the electrical arts. Methods to control the speed of electric motors are well known and documented in the electrical arts. The battery 131 and capacitor 132 described in this disclosure are commercially available. Methods to store electrical energy using batteries, capacitors, and a combination of batteries and capacitors are well known and documented in the electrical and chemical arts. Methods to interconnect electrical system for the transfer of power such as those described by the trailer electric system connection 121 and the distribution port 122 are well known and documented in the electrical arts.

The following definitions were used in this disclosure:

Battery: As used in this disclosure, a battery is a container consisting of one or more cells, in which chemical energy is converted into electricity and used as a source of power. As used in this disclosure, a plurality of interconnected batteries designed to store energy will be referred to as a single battery.

Capacitor: As used in this disclosure, a capacitor is a passive two terminal device that is used to directly store an electric charge. As used in this disclosure, a plurality of capacitors wired in parallel to each other will be referred to as a single capacitor.

DC: As used in this disclosure, DC is an acronym for direct current.

Electric Motor: In this disclosure, an electric motor is a machine that converts electric energy into rotational mechanical energy.

Generator: In this disclosure, a generator is a machine that converts rotational mechanical energy into electric energy.

Photovoltaic Cell: As used in this disclosure, a photovoltaic cell is an electrical device that directly converts light energy into electrical energy.

Port: As used in this disclosure, a port is an electrical termination that is used to connect a first electrical circuit to a second external electrical circuit. In this disclosure, the port is designed to receive a plug.

Transducer: As used in this disclosure, a transducer is a device that converts a physical quantity, such as pressure or brightness into an electrical signal or a device that converts an electrical signal into a physical quantity.

Voltage Regulator: This refers to an electrical circuit that takes unregulated voltage as its power input and provides a constant output voltage independent of variations to input power supply voltage or output, or load, current.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A renewable energy system comprising:
a plurality of photovoltaic cells, one or more axle assist devices, an electricity storage device, and a distribution system;
wherein the renewable energy system is a renewable energy based electrical system that is adapted for use with the trailer of a tractor-trailer;
wherein the trailer further comprises a first left tire group and a first right tire group;
wherein each trailer further comprises auxiliary electrical functions;
wherein each electricity storage device is a device that is designed to store electricity;
wherein the plurality of photovoltaic cells are electrically connected to the electricity storage device;
wherein the one or more axle assist devices are electrically connected to the electricity storage device;
wherein the distribution system are electrically connected to the electricity storage device;
wherein the plurality of photovoltaic cells are attached to the exterior of the trailer;
wherein each of the one or more axle assist devices attaches to a wheel group selected from the group consisting of the left wheel group or the right wheel group;
wherein when the trailer is accelerating each of the one or more axle assist devices draws energy from the electricity storage device to assist in the acceleration of the selected wheel group,
wherein when the trailer is decelerating the one or more axle assist devices draws energy from the selected wheel group to generate electricity;
wherein the electricity stored in the electricity storage device is further supplemented with a plurality of photoelectric cells;
wherein each of the one or more axle assist devices is an individual electric motor;
wherein each individual electric motor is further defined with a rotor and a stator;
wherein each individual electric motor is an electromagnetic device that further comprises a motor mode to convert electric energy into rotational energy that is accessible through the rotation of the rotor;
wherein each individual electric motor is an electromagnetic device that further comprises a generator mode to convert rotational energy applied to the rotor into electrical energy that will be stored by the electricity storage device;

wherein the stator of each individual electric motor is mounted on the trailer;

wherein the rotor is formed with an item selected from the group consisting of a permanent magnet or a set of one or more electrical conductors;

wherein the rotor of each individual electric motor is mounted on an axle;

wherein the axle is attached a tire group selected from the first left tire group or the first right tire group;

wherein the axle is mounted to the selected tire group such that the axle and the rotor is inserted into the stator;

wherein the one or more axle assist devices comprises a first individual electric motor and a second individual electric motor;

wherein the first individual electric motor is attached to the first left tire group;

wherein the second individual electric motor is attached to the first right tire group;

wherein the control system is an electrical device sets a target rotational speed for each individual electric motor;

wherein when the rotation of each individual electric motor is below the target rotational speed the individual electric motor draws energy from the electricity storage device;

wherein when the rotation of each individual electric motor is above the target rotational speed the individual electric motor stores energy in the electricity storage device;

wherein the setting of the target rotational speed for each individual electric motor is adjustable;

wherein the control system further comprises an override;

wherein the override allows an individual electric motor to draw power from the electricity storage device when the trailer is not in motion;

wherein the electricity storage device comprises a battery and a capacitor;

wherein the battery and capacitor are connected in parallel;

wherein the electricity storage device further comprises a one or more heat sinks;

wherein the plurality of photovoltaic cells are mounted on the sides and roof of the trailer;

wherein a selected subset of the one or more heat sinks is attached to the battery;

wherein a selected subset of the one or more heat sinks is attached to the capacitor.

2. The renewable energy system according to claim 1 wherein the plurality of photovoltaic cells are mounted on the exterior of the trailer such that over 530 square feet of the exterior of the trailer is covered by the plurality of photovoltaic cells.

3. The renewable energy system according to claim 2 wherein the plurality of photovoltaic cells are connected in parallel to the battery.

4. The renewable energy system according to claim 3 wherein the distribution system powers the auxiliary electrical functions of the trailer.

5. The renewable energy system according to claim 4
wherein the distribution system further comprises a trailer electric system connection;

wherein the trailer electric system connection is an electrical interconnection that connects the electricity storage device a plurality of electrical devices associated with the auxiliary electrical functions of the trailer.

6. The renewable energy system according to claim 5
wherein the trailer further comprises a second left tire group and at least a second right tire group;

wherein the one or more axle assist devices further comprises a third individual electric motor and a fourth individual electric motor;

wherein the third individual electric motor is attached to the second left tire group;

wherein the fourth individual electric motor is attached to the second right tire group.

7. The renewable energy system according to claim 6 wherein the distribution system powers further comprises a distribution port that allows power to be tapped from the electricity storage device for uses external to the trailer.

8. The renewable energy system according to claim 7 wherein each individual electric motor is a brushless DC electric motor with a variable speed control.

\* \* \* \* \*